United States Patent
Naegele et al.

[11] Patent Number: 6,125,129
[45] Date of Patent: Sep. 26, 2000

[54] FREQUENCY-DOUBLED DIODE-PUMPED SOLID-STATE LASER

[75] Inventors: Martin Naegele; Egon Pfeifer; Krassimir Stankov, all of Bremen, Germany

[73] Assignee: LASOS Laser-Fertigung GmbH, Germany

[21] Appl. No.: 09/066,407

[22] PCT Filed: Oct. 29, 1997

[86] PCT No.: PCT/EP97/05241

§ 371 Date: Apr. 29, 1998

§ 102(e) Date: Apr. 29, 1998

[87] PCT Pub. No.: WO98/13911

PCT Pub. Date: Apr. 2, 1998

[30] Foreign Application Priority Data

Sep. 27, 1996 [DE] Germany .......................... 196 39 769

[51] Int. Cl.[7] .................................................... H01S 3/10
[52] U.S. Cl. ............................ 372/22; 372/34; 372/103
[58] Field of Search .............................. 372/22, 98, 103, 372/34

[56] References Cited

U.S. PATENT DOCUMENTS 5,539,765  7/1996  Sibbett et al. ............................. 372/92
5,854,802  12/1998  Jin et al. .................................. 372/34

FOREIGN PATENT DOCUMENTS 0 596 714  5/1994  European Pat. Off. .
42 05 587  9/1992  Germany .
41 32 063  4/1993  Germany .

OTHER PUBLICATIONS

OPTICS LETTERS / vol. 21, No. 3 / Feb. 1, 1996 "Blue Microchip laser fabricated from Nd:YAG and KNbO$_3$" Matthews, et al.

*Primary Examiner*—Leon Scott, Jr.
*Attorney, Agent, or Firm*—McAulay Nissen, et al.

[57] ABSTRACT

A frequency-doubled diode pumped solid state laser with intracavity frequency doubling comprises a lasing solid state medium with suitable reflecting coats which makes up a component part of a resonator cavity. The solid state laser further comprises at least one pumped light source constructed as a laser diode and a frequency doubling nonlinear optical element in the form of a nonlinear crystal with suitable reflective coatings which forms a further component part of the resonator cavity. This resonator cavity is formed between reflective coatings of the solid state medium and of the element. The pumped radiation is transmitted to the lasing solid state medium through optical means. At least one aperture of a material with good thermal conductivity is provided at the element and/or at the lasing solid state medium. The frequency doubling optical element is designed for phase matching at a higher temperature than the surrounding temperature.

8 Claims, 4 Drawing Sheets

FREQUENCY-DOUBLED DIODE-PUMPED SOLID-STATE LASER

BACKGROUND OF THE INVENTION a) Field of the Invention

The invention is directed to a frequency-doubled diode pumped solid state laser with intracavity frequency doubling, comprising a lasing solid state medium with suitable reflecting coats which makes up a component part of a resonator cavity, at least one pumped light source constructed as a laser diode for generating suitable pumped light radiation, a frequency doubling nonlinear optical element in the form of a nonlinear crystal with suitable reflective coatings which forms another component part of the resonator cavity, wherein the resonator cavity is formed between reflective coatings of the solid state medium and of the frequency doubling element, and optical means following the pumped light source and conducting the pumped radiation to the lasing medium.

b) Description of the Related Art

Lasers of the type mentioned above have their own characteristic noise behavior which is brought about by the combined action of nonlinear processes such as frequency doubling, the mixture of longitudinal modes, and spatial hole burning in the active lasing medium. In lasers with internal frequency doubling, this characteristic is known as the "green problem". The noise behavior is characterized by a periodic change in the amplitude of the light by several tens of kilohertz to several hundred kilohertz or as a result of uneven fluctuations. The amplitude of the noise ranges from several percent to 100% of the modulation. Nonlinear crystals such as those used in solid state lasers exhibit absorption losses during radiation at the fundamental frequency and during frequency-doubled radiation. These absorption losses lead to unwanted heating of the nonlinear crystal. The changes in temperature occurring in this connection in the central zone of the laser beam can reach several hundred degrees K. As a result of the occurring temperatures and their distribution over the cross section of the nonlinear frequency doubling crystal, a detuning occurs at the latter, so that an optimum phase matching cannot be carried out resulting in reduced output of the frequency-doubled radiation. This means that almost no known frequency-doubled sold state lasers can operate in an optimum manner.

Various methods are known for eliminating or suppressing noise and for preventing these disadvantages.

For example, a method based on frequency selection and single-mode operation is described in the periodical "Optics Letters", Vol. 16 (1991), pages 1665ff ("Single-longitudinal-mode operation and second harmonic generation of Nd:YVO$_4$ microchip laser"). Since there is no interaction between the longitudinal modes in single-mode operation, green noise is eliminated. Thus, there is only one oscillating mode and the noise caused by the green problem is virtually eliminated. The disadvantage therein consists in the relatively complicated construction of the resonator, whose object is to enable realization of single-mode operation (single longitudinal mode). In many cases, such low-noise operation of a laser of this kind is achieved through the use of a Type II nonlinear crystal (KTP or KTiOPO$_4$) as part of a birefringent filter, e.g., a Lyot filter ("Optics Letters", Vol. 13, (1988), pages 805 to 807).

An intracavity frequency-doubled laser which is described in U.S. Pat. No. 4,933,947 has an improved amplitude structure which was achieved substantially in that the spatial hole burning in the lasing material is eliminated by the use of quarter-wave plates and the optical resonator of the laser is maintained at a temperature leading to an essentially low-noise generation of optical radiation. However, this requires a separate thermal stabilization of the arrangement depending on the noise level of the radiation.

German Offenlegungsschrift 42 05 587 A1 discloses a frequency-doubled single-frequency laser including a laser diode, a rare-earth-doped laser crystal, and a frequency doubling material in a shared resonator. This arrangement generates a stable green optical radiation and does not exhibit the problems caused by spatial hole burning, so that there is a single-frequency mode at the output of the laser.

A stable low-noise laser operation is achieved within a narrow temperature range which is realized by a suitable electronic circuit. However, a disadvantage consists in the complicated construction of the resonator which inhibits widespread use of this type of laser.

WO 95/21480 and U.S. Pat. No. 5,446,749 disclose a diode pumped laser in which the intracavity frequency doubling of a large number of longitudinal modes is used in order to suppress noise and achieve a high amplitude stability. The length of the resonator is configured for about 100 modes. This solution is disadvantageous in that it requires a resonator length of greater than one meter, which is not practical for many applications and limits its range of uses or application as a high-output laser.

OBJECT AND SUMMARY OF THE INVENTION

It is the primary object of the invention to provide a frequency-doubled diode pumped solid state laser which eliminates the disadvantages of the prior art, is simply constructed, occupies little space and in which noise is extensively suppressed.

According to the invention, this object is met in a frequency-doubled diode pumped solid state laser in that at least one aperture of thermally conductive material is provided at the frequency doubling element and/or at the lasing solid state medium and in that the frequency doubling optical element is designed for phase matching at a higher temperature than the surrounding temperature.

It is advantageous when the thermally conductive aperture is dimensioned in such a way that an individual transverse mode TEM$_{00}$ is realized.

It is further advantageous when the thermally conductive apertures which favorably guide off heat are arranged on both end faces of the frequency doubling element, wherein this element is a crystal of potassium titanyl phosphate (KTP), a highly nonlinear material, or comprises ammonium dihydrogen phosphate (ADP), lithium triborate (LBO), lithium iodate or other suitable materials such as those indicated in U.S. Pat. No. 5,164,947. The lasing solid state medium, that is, the actual laser crystal, advantageously comprises Nd:YAG; Nd:YVO$_4$; Nd:LSB or other suitable materials that are known per se.

Also contributing to the realization of favorable thermal conditions within the entire resonator cavity, which includes the laser crystal and the frequency doubling element which is likewise a crystal, is the feature according to which the laser crystal and the frequency doubling element are in thermal contact with the thermally conducting aperture.

The laser crystal, as active lasing medium, is provided at its ends with suitable reflecting or transmitting coatings, as is the frequency doubling element. Thus, a first surface of the laser crystal which faces the pumped light source arranged in front of the laser crystal is coated with a coating which is highly transmissive for the pumped radiation emitted by the pumped light source, but highly reflective for the laser radiation generated by the lasing material with a fundamental frequency and fundamental wavelength. The other surface of the laser crystal located opposite from the first surface, mentioned above, is provided with an anti-reflective layer which makes it possible for the laser radiation to exit the laser crystal with the fundamental wavelength with low losses.

The nonlinear element, namely the nonlinear crystal which doubles the frequency of the laser radiation exiting from the laser crystal is coated at its surface facing the laser crystal with an anti-reflective layer effective for the laser radiation. The oppositely located surface of this element is provided with a coating which is highly reflective for the laser radiation with the fundamental wavelength. For the radiation which is formed in the element itself and is modified with respect to frequency and with half the wavelength or with double the frequency of the radiation of the lasing crystal, the above-mentioned oppositely located surface is provided with a coat which makes it possible for the frequency-doubled radiation to exit from the element with low losses. Accordingly, among other things, there is no extensive heating of the laser crystal or of the frequency doubling element which causes radiation losses.

The solution according to the invention is designed and provided for phase matching of the frequency doubling crystal for operating at higher temperatures, i.e., at normal temperatures a phase matching which is not optimum must be tolerated with frequency doubling. As soon as the lasing medium of the laser emits radiation, the temperature in the laser crystal rises, which is caused in this element by the absorption of the laser radiation as well as of the frequency-doubled radiation. Accordingly, in the solid state laser according to the invention the phase matching is always optimum and the output of the frequency-doubled radiation continuously increases until an optimum temperature is reached.

This process of self-optimization continues until an optimum phase matching is achieved. If a high efficiency is achieved in the solid state laser when generating the frequency-doubled radiation, the temperature of the frequency doubling element is also stabilized. As a result of this self-optimizing process, the laser reaches a stable optimum operating state which is expressed in a substantial reduction in noise.

BRIEF DESCRIPTION OF THE DRAWINGS

The invention will be explained more fully hereinafter with reference to an embodiment example. Shown in the accompanying drawings are.

DESCRIPTION OF THE PREFERRED EMBODIMENTS

Figure 1:
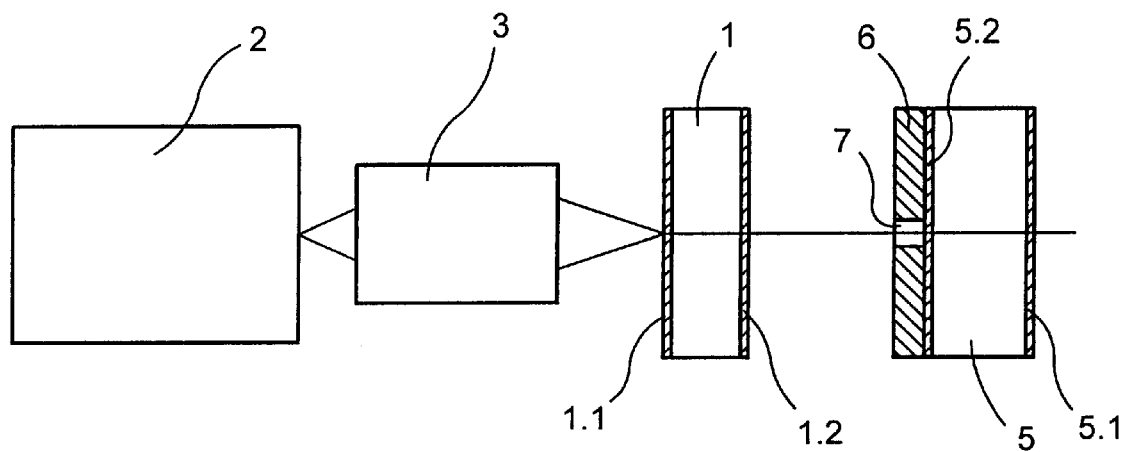
FIG. 1 a block diagram of a solid state laser according to the invention.

The frequency-doubled diode pumped solid state laser shown in the block diagram in FIG. 1 comprises a lasing solid state medium 1 with suitable reflective and transmissive coatings 1.1, 1.2 and is constructed as a laser crystal. For example, this laser crystal comprises Nd:YAG, Nd:YAP, Nd:YVO$_4$, Nd:GdWO$_4$ or Nd:LSB and is a component part of a resonator cavity.

Further, a pumped light source 2 is provided for generating suitable pumped light radiation in order to stimulate the solid state medium 1 to generate laser radiation. In so doing, it is advantageous when at least one laser diode is used as a pumped light source 2. Optical means 3 are arranged between the lasing solid state medium 1 and the pumped light source 2 and transmit the pumped light radiation to the lasing medium 1. These optical means 3 can be, e.g., light guides or lenses.

Also making up a component part of the resonator cavity is a nonlinear optical element 5 doubling the frequency of the laser radiation exiting the laser crystal, for example, a nonlinear crystal of KTP, KDP, LBO, ADP or LilO$_3$ which is advantageously coated with suitable reflecting layers 5.1. This element 5 is so designed that an optimum phase matching is effected at a temperature higher than the surrounding temperature. The region of the resonator cavity is located between the coatings 1.1 of the lasing medium 1 and the layers 5.1 of the optical element 5. An aperture 6 of thermally conductive material is provided in close thermal contact with the frequency doubling element 5 and/or with the lasing solid state medium 1. This aperture 6 can be, e.g., a foil made from indium or from another suitable material which has a central opening 7 through which the generated radiation can pass.

The coating of the individual surfaces is advantageously carried out in the following manner: the surface of the lasing solid state medium 1 which faces the pumped light source 2 is coated by vapor deposition with a layer 1.1 which is highly transparent for the pumped light radiation but highly reflective for the laser radiation. The other surface of the solid state medium 1 is coated with an anti-reflective layer 1.2 which is transmissive for the laser radiation. In order to ensure a good low-loss transition of laser light into the frequency doubling element 5, the surface 5.2 of the element 5 facing the lasing solid state medium 1 is provided with an anti-reflective layer.

The other surface of the element 5 has a layer 5.1 which does not transmit the wavelength of the laser radiation but which is highly transmissive for the frequency-doubled or wavelength-halved radiation of the element 5.

Figure 2:
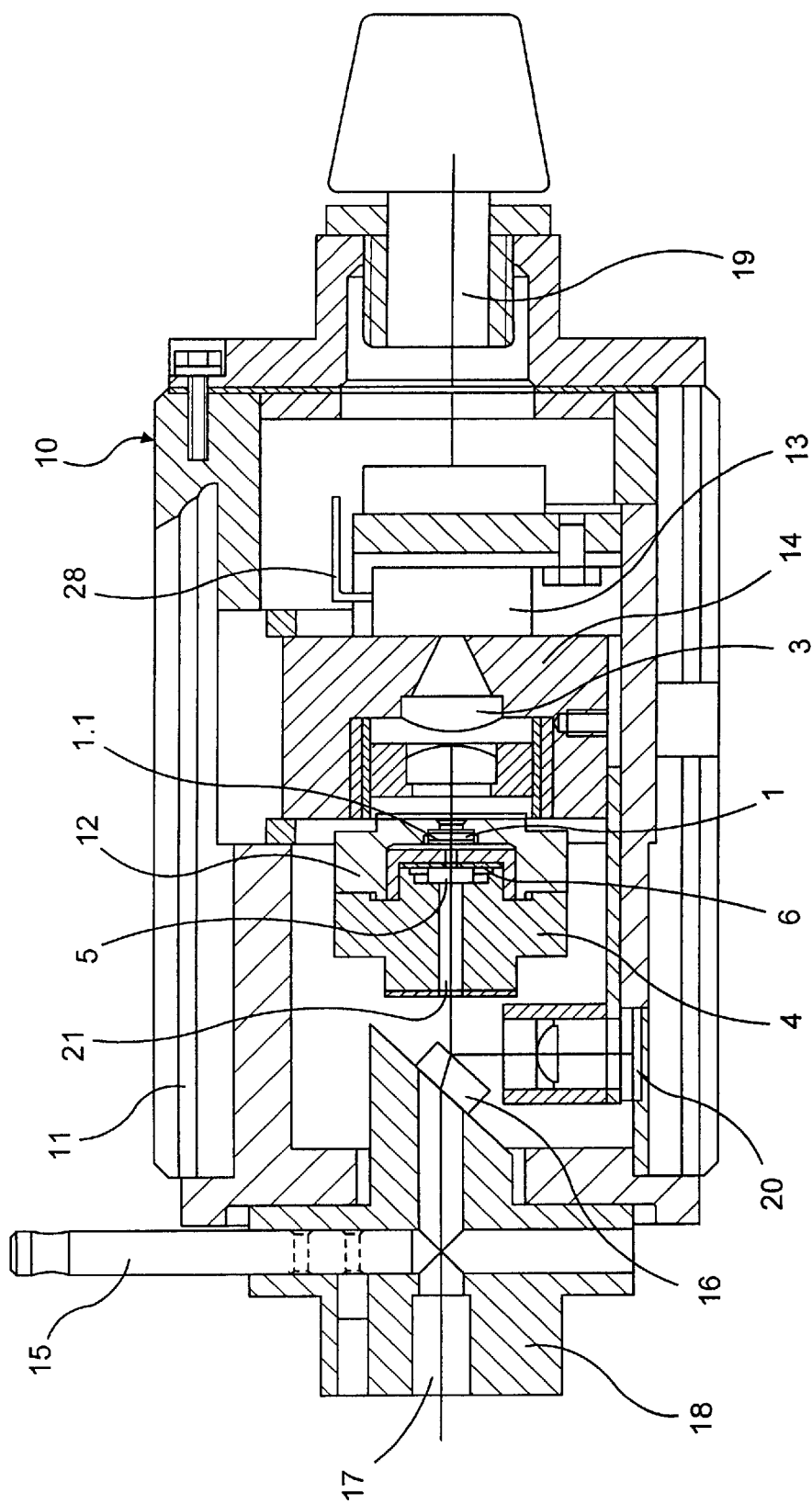
FIG. 2 a section through a laser of the above-mentioned type.

The solid state laser shown in section in FIG. 2 has a housing 10 with a cooling body or heat sink 11 in which the lasing solid state medium 1 (laser crystal) is arranged in a holder 12. A laser diode 13 serving as a pumped light source 2 is arranged in the housing 10 so as to be axially aligned with the laser crystal. The optical means 3 transmitting the pumped light radiation to the laser crystal are situated between the laser diode 13 and the lasing solid state medium 1. A Peltier element 14, with which the laser diode 13 is closely connected thermally, serves for temperature adjustment in the housing 10 and accordingly also in the entire resonator cavity. In the solution according to the invention the temperature at which the noise of the output radiation is lowest is determined once prior to assembly of the laser, the cavity always being adjusted again to this temperature thereafter by means of the Peltier element 14 during operation of the laser.

The holder 4 for the frequency doubling element 5 is provided at the side of the lasing medium 1 remote of the laser diode 13. The aperture 6 of material with good thermal conduction, e.g., indium or another suitable material, is arranged at the frequency doubling element 5.

The light which is generated by the lasing solid state medium 1 and doubled in frequency by the element 5 is emitted outward via a beam splitter 16 through an opening 17 which can be closed by a closure 15. A portion of the emitted light is deflected by the beam splitter 16 to a monitor diode 20 by means of which the operating state of the laser arrangement, among other things, can be displayed. Closing covers 18 and 19 are provided at both sides of the housing 10 so that the housing 10 can be closed.

Figure 3:
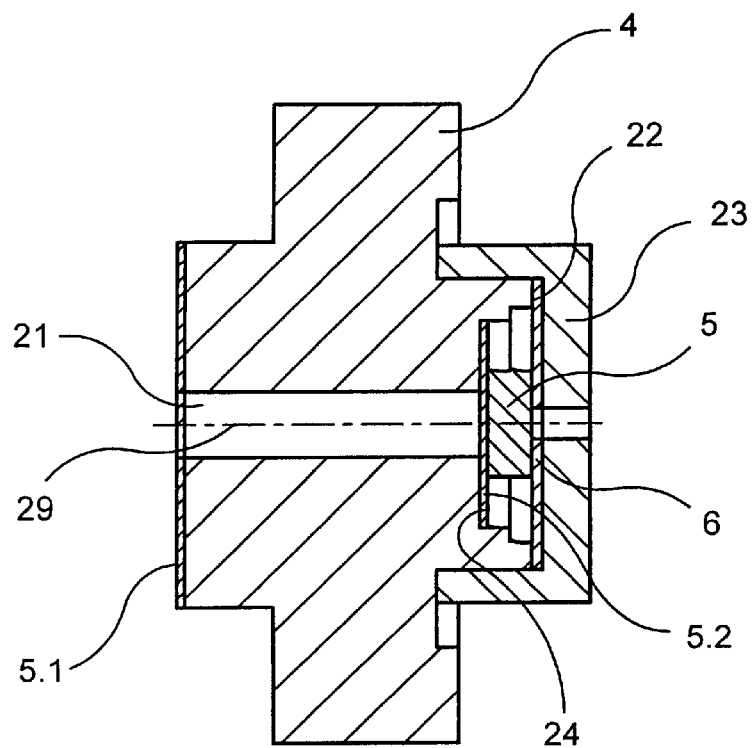
FIG. 3 a frequency doubling element with aperture.

As can be seen from FIG. 3, the frequency doubling element 5 is arranged in the holder 4 which is provided with a central bore hole 21 through which the light is radiated outward via the beam splitter 16 (compare FIG. 2) and the opening 17 (FIG. 2). The aperture 6 exhibiting good thermal conduction is connected by one of its side surfaces to one end face 22 of the holder 4 and by its other side surface to a cover 23. The frequency doubling element 5, a nonlinear optical crystal, known per se, is arranged between one surface 24 of the holder 4 and the surface of the aperture 6 connected with one end face 22. The intimate contact between the element 5 and the holder 4 on the one hand and between the element 5 and the favorably thermally conductive aperture 6 on the other hand brings about good heat dissipation and heat distribution for the element 5.

Figure 4:
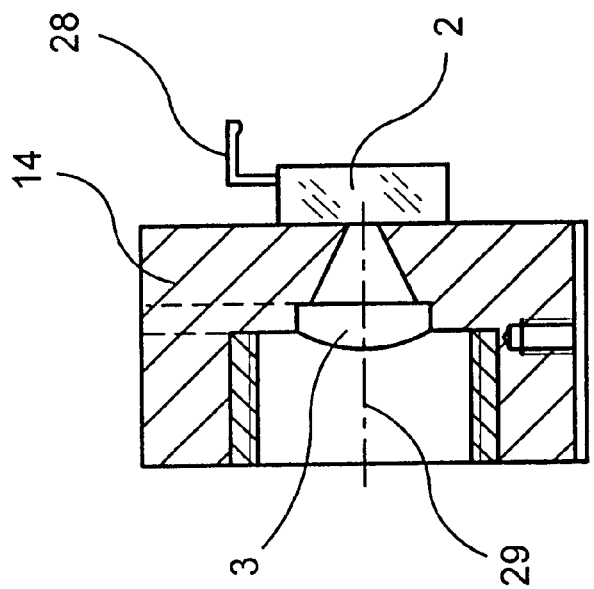
FIG. 4 the holder for the lasing solid state medium.
Figure 5:
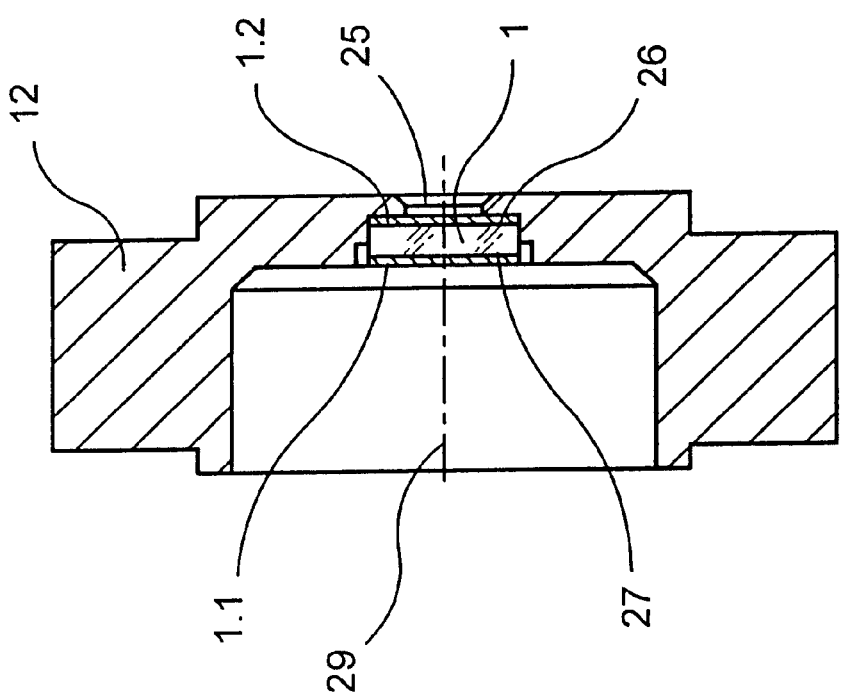
FIG. 5 the pump device with a laser diode.

FIG. 4 shows the arrangement of the lasing solid state medium 1 (laser crystal) in a holder 12 provided for this purpose, wherein the light inlet opening 25 of the lasing solid state medium 1 faces the pumped light source 2 (compare FIG. 1 and FIG. 5). The end faces 26 and 27 are advantageously coated with optically acting coatings 1.1 and 1.2, For example, the end face 26 which faces the pumped light source is provided with a coating 1.2 which is highly transmissive for the pumped radiation and the end face 27 is provided with a coating 1.1 which is highly reflective for the laser radiation.

FIG. 5 shows the construction of the pump device which comprises a Peltier element 14 and a pumped light source 2, for example, a laser diode 13 (compare FIG. 2) or another suitable light source. The pumped light source 2 is supplied with current via connections 28. The radiation emanating from the pumped light source 2 is supplied to the laser crystal (solid state medium 1) via optical means 3 which follow the light source and which are shown in FIG. 5 as a lens. The Peltier element 14 serves for adjusting the temperature of the pumped light source 2 and of the entire laser cavity in order to enable operation in a temperature range in which the noise level of the emitted radiation is lowest.

In the laser arrangement according to the invention (compare FIG. 2), the pump device, the holder 12 for the laser crystal and the holder 4 for the frequency doubling element 5 are arranged in alignment with the optical axis 29. The lasing solid state medium 1 and the frequency doubling element 5 are advantageously in close thermal contact with an individual aperture 6 (not shown in the drawings). In this way, it is possible to achieve a particularly advantageous regulation and adjustment of temperature to a value at which the noise of the output radiation of the laser is at a minimum. In the solid state laser according to the invention, this temperature value is adjusted during assembly and is maintained during laser operation by means of the Peltier element 14 or by means of another suitable arrangement. The spatial hole burning does not have a negative influence on noise behavior in a laser with an aperture 6 according to the invention.

Figure 6:
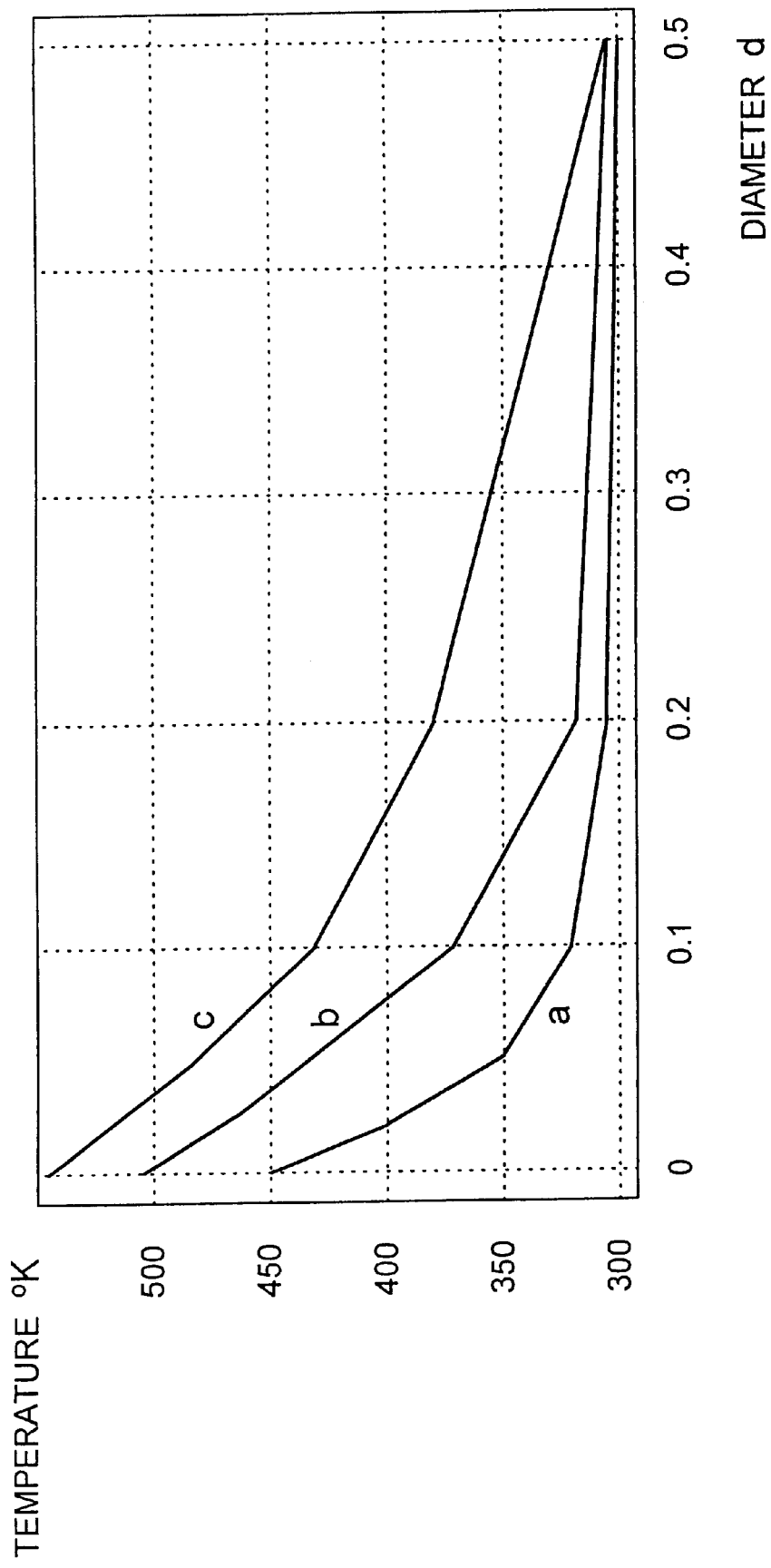
FIG. 6 the temperature of the cavity over the diameter of the opening of the aperture.

FIG. 6 shows the temperature curve over the diameter d of the opening 7 of the aperture 6 (compare FIG. 1) for openings 7 of different magnitudes, where a=0.1 mm; b=0.25 mm, and c=0.5 mm.

An improvement results from the effective cooling by using a good thermally conducting aperture 6 which makes good contact with the frequency doubling crystal or laser crystal. It can be seen that the temperature in the center of the respective crystals with the present thermally conducting aperture 6 depends substantially on the dimensions of the opening 7 of the aperture 6, but does not depend on the surrounding temperature. Accordingly, there is no need for a temperature control of the kind applied in the prior art (U.S. Pat. No. 4,933,947).

While the foregoing description and drawings represent the present invention, it will be obvious to those skilled in the art that various changes may be made therein without departing from the true spirit and scope of the present invention.

What is claimed is:

1. A frequency-doubled diode pumped solid state laser with intracavity frequency doubling, comprising:
   a lasing solid state medium with reflecting coats which makes up a component part of a resonator cavity;
   at least one pumped light source constructed as a laser diode for generating suitable pumped light radiation;
   a frequency doubling nonlinear optical element in the form of a nonlinear crystal with reflective coatings which forms another component part of the resonator cavity; a resonator cavity being formed between reflective coatings of the solid state medium and of the frequency doubling element;
   optical means follow the pumped light source for conducting the pumped radiation to the lasing solid state medium;
   at least one aperture of thermally conductive material being provided at the frequency doubling element and/or at the lasing solid state medium; and
   said frequency doubling optical element being designed for phase matching at a higher temperature than the surrounding temperature.

2. The solid state laser according to claim 1, wherein the at least one thermally conductive aperture is dimensioned so that an individual transverse mode $TEM_{00}$ is realized.

3. The solid state laser according to claim 1, wherein a thermally conductive aperture is arranged on each of the two surfaces of the frequency doubling element.

4. The solid state laser according to claim 1, wherein the lasing solid state medium and the frequency doubling element are in thermal contact with the thermally conducting aperture.

5. The solid state laser according to claim 1, wherein the lasing solid state medium comprises Nd:YAG; Nd:YAP;Nd:YVO$_4$; Nd:GdWO$_4$; Nd:LSB and like materials.

6. The solid state laser according to claim 1, wherein the frequency doubling element preferably comprises KTP; KDP; LBO; LBO; ADP or LiIO$_3$.

7. The solid state laser according to claim 1, wherein the optical means are optical lenses which conduct the pump radiation from the pumped light source to the lasing solid state medium.

8. The solid state laser according to claim 1, wherein the lasing solid state medium and the frequency doubling element are in thermal contact with an individual shared aperture.

* * * * *